May 29, 1928.
W. C. SCHLITZER
LENS BLANK AND METHOD OF MAKING SAME
Filed June 9, 1926
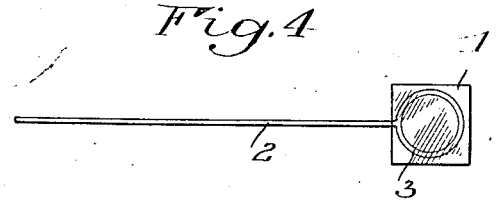
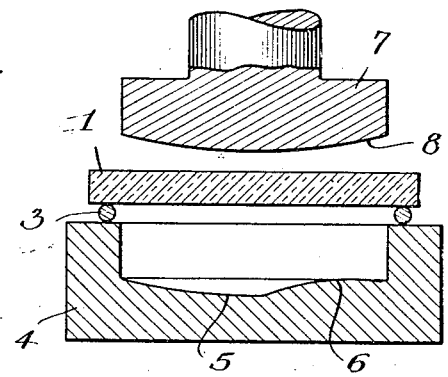
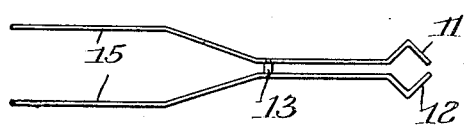
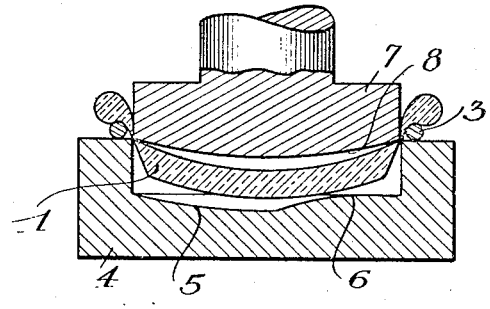
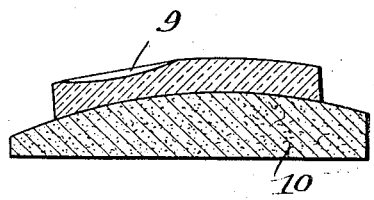
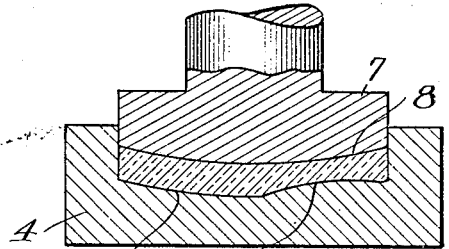
INVENTOR
Walter C. Schlitzer
BY Harold E. Stonebraker
his ATTORNEY Patented May 29, 1928.

1,671,548

UNITED STATES PATENT OFFICE.

WALTER C. SCHLITZER, OF ROCHESTER, NEW YORK.

LENS BLANK AND METHOD OF MAKING SAME.

Application filed June 9, 1926. Serial No. 114,795.

This invention relates to a lens blank and method of making the same, and has for its principal object to produce, by a moulding process, a lens blank sufficiently transparent and free from surface flaws to require no rough grinding operations.

In making fused bifocal lenses, the general practice heretofore has been to mould a blank in such a way as to require rough grinding, to remove surface flaws and foreign matter, after which a depression for the small lens blank is ground into the surface of the larger blank, and it is a further object of this invention to mould the depression for the small lens blank in the surface of the larger blank instead of grinding it in, and to mould the blank in such a way as to produce transparent surfaces that require no rough grinding operations.

Another object of the invention is to afford a method by which a lens receiving recess can be moulded into a blank so as to require no rough grinding of the recess or of the main surface of the blank, thus insuring the contour and relation of the depression produced by the moulding operation.

Still an additional object of the invention is to produce a lens blank by a moulding process, and to so treat the blank as to remove any distortion caused by cooling after moulding, thus permanently imparting to the blank the contour of the mould.

To these and other ends, the invention comprises the construction and method that will appear from the following description when read in conjunction with the accompanying drawing, the novel characteristics and features being pointed out in the claims following the description.

In the drawings:

Figure 1 is a vertical sectional view illustrating the manner of positioning a viscous body of glass above a mould, with the plunger about to be lowered to cut the lens forming area from the glass body;

Figure 2 is a similar view with the plunger descended far enough to cut the lens forming area from the glass body;

Figure 3 is a similar view showing the plunger in its lowermost position with the glass pressed into the mould;

Figure 4 is a detail view of one form of holder, with a piece of glass positioned thereon;

Figure 5 is a detail view of another form of holder, and

Figure 6 is a sectional view illustrating the blank arranged on a master surface for setting the curves of the blank.

My invention is applicable to both single and bifocal lenses, and for convenience, I have disclosed it herein as applied to a bifocal lens. The usual method in the production of blanks for fused bifocal lenses has been to heat a piece of glass to a viscous state while it rests on a fire brick provided with powder to prevent the glass from adhering to the brick. The piece of glass is usually of proper size to fit into a mould and after being sufficiently heated, is placed in the mould and pressed into form. The powder and dirt particles of the fire-brick adhere to the surface of the glass, with the result that when the moulding operation is complete, the surfaces of the blank are opaque and contain various flaws, requiring considerable rough grinding to reduce the surfaces to sufficient transparency to permit proper inspection and to prepare the blank for the finish-grinding operations. After the rough grinding operations referred to above are completed, the depression or recess for the small lens is ground into the surface of the blank, and with the processes heretofore available, it has not been practical to mould a lens receiving depression into a blank.

With the present process, a piece of glass is heated to a sufficiently viscous state for moulding, while supporting it without touching the surfaces of the lens forming area of the glass, or bringing such surfaces into contact with a fire brick or other surface defacing medium. Consequently when the blank is moulded, both surfaces are transparent and sufficiently free from surface flaws to obviate the necessity of rough grinding operations, and therefore the original contour of the small lens receiving depression and its relation to the surrounding surface of the lens is maintained.

According to one method of procedure, a piece of glass such as 1 is positioned on a holder 2 having a circular glass supporting portion 3. By means of such holder, the glass is held in a furnace until it reaches the proper viscous state for moulding. The holder is then positioned with the glass 1 and supporting portion 3 over the mould 4, as shown in Figure 1. The mould 4 has a concave bottom 5 with a convex enlargement or projecting portion 6, while 7 is a plunger having a convex bottom 8, although the plunger may be concave with a convex enlargement, and the mould convex, if desired.

With the parts arranged as just described, and the glass heated to a proper viscous state, the plunger 7 is permitted to descend in the manner shown in Figure 2, moving downwardly within the supporting portion 3 of the holder, and stamping the lens forming area from the body of glass. The central or lens forming area of the piece of glass is thus forced downwardly into the mould until the plunger assumes its final position shown in Figure 3, forming a lens blank with the usual concave and convex surfaces, the latter having the concave lens receiving depression or recess 9 formed therein by the raised portion 6 of the mould.

As the blank cools, after being taken from the mould, its surfaces become somewhat distorted, and it is essential to preserve the exact curvature of the surfaces and enlargement of the mould and plunger. To accomplish this, after removing the blank from the mould, I place it on a master form 10, the curve of which conforms exactly to that of the mould, or of the plunger. While the blank rests upon the master form 10, which is of fire brick or other suitable fire resistant material, it is again heated, and subjected to a temperature which will cause it, if distorted, to re-conform closely to the curvature of the master form 10, and thus re-assume the precise form of the mould and plunger. Such reheating trues the blank and insures its permanently retaining the curvatures of the mould and plunger, and prevents the original size or form of the lens receiving depression, or its relation to the surrounding surface of the lens, from being in any way changed.

With this procedure, the surfaces of the finished blank are transparent and free from flaws to such an extent that no rough grinding operations are required. A slight finish-grinding operation in the depression 9 is sufficient to prepare it to receive the small lens that is fused thereto.

While I have illustrated in Figures 1 and 4 one form of holder for supporting the piece of glass while heating, other types of supports can be used for this purpose. Where a thicker piece of glass is employed in the beginning of the operation, a holder such as shown in Figure 5 can be used, consisting of two relatively movable glass supporting members 11 and 12 pivoted to a support 13 and adapted to be separated by moving the handle portions 15 toward each other. The glass is heated while resting on the portions 11 and 12, after which it is positioned under the plunger and the handle portions 15 pressed together. This spreads the supporting portions 11 and 12 and likewise spreads or thins the viscous glass body as the plunger descends into the mould. In other respects, the operation is the same as that already described.

While I have described the invention with reference to certain structure and procedure, it is not confined to the details or steps herein described, and this application is intended to cover any lenses or variations of the method described, coming within the fundamental principles disclosed, or the scope of the following claims.

I claim:

1. The method of making a lens blank which consists in heating a piece of glass to a viscous state while supporting it entirely outside of its lens forming area, then supporting the glass over a mould, and moving a plunger to stamp out said lens forming area and force it into the mould, at the same time severing the lens forming area from the supporting area.

2. The method of making a bifocal lens blank, which consists in heating a piece of glass to a viscous state while supporting it entirely outside of its lens forming area, then supporting the glass over a mould, and moving a plunger to stamp out said lens forming area of the glass and completely sever it from the supporting area and force it into the mold, one of said parts having a convex surface and the other of said parts having a concave surface with a convex enlargement, thereby forming a blank with a depression therein to receive a smaller lens.

3. The method of making a lens blank which consists in heating a piece of glass to a viscous state while supporting it without touching the lens forming area thereof, and thereafter permitting a plunger to stamp out the lens forming area from the body of glass and force it into a mould, said lens forming area being completely severed from that part of the glass in contact with the support.

4. The method of making a lens blank which consists in heating a piece of glass to a viscous state while supporting it outside the lens forming area of the glass, moving a plunger to stamp out the lens forming area and force it into a mould, and reheating the blank while supporting it on a master surface having a curvature conforming to that of the mould until it assumes the permanent form of said master surface.

5. The method of making a bifocal lens blank, which consists in heating a piece of glass to a viscous state while supporting it outside of its lens forming area, then supporting the glass over a mould, and moving a plunger to stamp out said lens forming area of the glass and force it into the mould, one of said parts having a convex surface and the other of said parts having a concave surface with a convex enlargement, thereby forming a blank with a depression therein to receive a smaller lens, and reheating the blank while supporting it on a master surface having a curvature conforming to that of the mould until it assumes the permanent form of said master surface.

In witness whereof, I have hereunto signed my name.

WALTER C. SCHLITZER.